United States Patent [19]
Okano

[11] 3,755,739

[45] Aug. 28, 1973

[54] DATA SIGNAL TRANSMISSION SYSTEM EMPLOYING PHASE MODULATION

[75] Inventor: Yoshimitsu Okano, Tokyo, Japan

[73] Assignee: Nippon Electric Company, Limited, Tokyo, Japan

[22] Filed: Mar. 2, 1971

[21] Appl. No.: 120,298

[30] Foreign Application Priority Data

Sept. 5, 1970 Japan .............................. 45/77979

[52] U.S. Cl. .............. 325/163, 178/67, 178/DIG. 3, 179/15 BC

[51] Int. Cl. .............................................. H04b 1/04

[58] Field of Search ........................ 325/30, 60, 163, 325/49, 50, 138, 329, 26, 36; 178/66, 67, DIG. 3; 179/15 BC

[56] References Cited

UNITED STATES PATENTS

| | | | |
|---|---|---|---|
| 3,516,023 | 6/1970 | Herman | 325/30 X |
| 3,517,338 | 6/1970 | Herman | 325/30 X |
| 3,229,230 | 1/1966 | Feldman | 325/138 |
| 3,548,325 | 12/1970 | Salter et al. | 178/DIG. 3 |
| 3,196,350 | 7/1965 | DiGon | 325/26 |

*Primary Examiner*—Albert J. Mayer
*Attorney*—Sughrue, Rothwell, Mion, Zinn & Macpeak

[57] ABSTRACT

Data transmission systems utilizing phase modulation wherein wave distortion and intersymbol interference are reduced by requiring carrier signals to undergo gradual phase shifts over a time interval $T_0$ in response to data signals. In that phase shifting occurs over a time interval $T_0$ rather than instantaneously, band width reduction is realized with accompanying reduction in wave form distortion and intersymbol interference.

5 Claims, 77 Drawing Figures

DATA SIGNAL TRANSMISSION SYSTEM EMPLOYING PHASE MODULATION

The present invention relates to a data signal transmission system employing phase modulation and, more particularly, to a data signal transmission system of the kind permitting narrow-band transmission or highly multiplexed transmission.

In the conventional data signal transmission system employing phase modulation in which, the phase of a carrier wave is shifted instantaneously at the phase-shift time point, the frequency spectrum and energy distribution thereof are expanded to a wide range. As a result, waveform amplitude distortion and intersymbol interference occur because the frequency band of the transmission line is limited. To cope with such intersymbol interference, a method has been proposed by P.A. Baker in his paper "Phase-modulation Data Sets for Serial Transmission at 2,000 and 2,400 Bits per Second" (AIEE Trans. July 1962), wherein a carrier wave is subjected to the instantaneous phase shift and then to envelope modulation, and the resultant waveform is shaped by the use of filters, etc. Another method for preventing the intersymbol interference utilizes parallel transmission of low speed phase modulation, as proposed in a paper "Kineplex, A Bandwidth Efficient Binary Transmission System" by R.R. Mosier and R.G. Clabough (AIEE Trans. January 1958) These conventional methods, however, are not sufficient to eliminate wave form distortion and intersymbol interference. The remaining amplitude distortion of the phase modulated carrier at the phase alternating time points lowers the signal-to-noise ratio thereat, causing the intersymbol interference and code errors.

An object of this invention is therefore to provide a data signal transmission system employing phase modulation, which minimize the energy distribution at the phase alternating time point by a novel phase shifting method and thereby causes little intersymbol interference and wave form amplitude distortion.

Another object of this invention is to provide a data signal transmission system employing phase modulation, which permits data transmission based on the single-side-band techniques contributing to the higher data density.

The basic principle of the system of this invention is as follows. Two carrier waves having 90° phase difference from each other, represented by $A(t)\cos\omega_c t$ and $B(t)\sin\omega_c t$ respectively, are assumed wherein $\omega_c$ denotes a carrier angular frequency, $t$ a time, $A(t)$ and $B(t)$ amplitudes thereof being the function of time. Then, the combined wave of the two carrier waves, namely the phase-shifted signal is expressed as $$f(t) = \sqrt{A^2(t) + B^2(t)}\cos(\omega_c t + \tan^{-1} B(t)/A(t) \quad (1)$$

If $A(t)$ and $B(t)$ are varied in accordance with Equation (2) below, $$A^2(t) + B^2(t) = A^2 \text{ (where A is a constant)} \quad (2)$$

then $f(t)$ can be considered as a signal whose amplitude is constant (=A) and only the phase is varied.

Assume that the phase is shifted by an angle $\phi$ by changing $A(t)$ and $B(t)$ not instantaneously but over a time duration from $t_o$ to $(t_o + T_o)$, namely for the period of time $T_o$. Then the phase-modulated signal may be expressed as $$f(t) = A\cos(\omega_c t + \phi_o), \text{ for } t \leq t_o \quad (3)$$

$$f(t) = A\cos(\omega_c t + \phi_o + \phi), \text{ for } t \geq t_o + T_o \quad (4)$$

$$f(t) = A\cos[\omega_c t + \phi_o + \omega(t - t_o)], \text{ for } t_o < t < t_o + T_o \quad (5)$$

where $\phi_o$ is an initial phase, and $\omega = \phi/T_o$

To realize phase shift as above, it is necessary to change $A(t)$ and $B(t)$ for a time duration from $t_o$ to $(t_o+T_o)$ according to the following Equations:

$$A(t) = A\cos[\omega(t - t_o)] \quad (6)$$

$$B(t) = A\sin[\omega(t - t_o)] \quad (7)$$

While, Equation (5) may be rewritten as $$f(t) = A\cos[\omega_c + \omega)t + \phi_o - \omega t_o]$$

Hence, it can be said that signal transmission is available with little waveform distortion and intersymbol interference if the bandwidth of $\omega/2\pi$ which allows the passage of angular frequencies covering $\omega_c$ to $\omega c + \omega$ is given. Also, this bandwidth can be narrowed by increasing the time $T_o$ since $\omega = \phi/T_o$. In other words, $T_o$ is determined by $\omega$. Therefore, by taking time $T_o$ for phase shift, waveform distortion and intersymbol interference can be reduced. Then, data transmission system involving little waveform distortion and intersymbol interference is feasible if the frequency bandwidth W is determined in terms of angular frequency as follows, when $$W \geqq |\phi\text{max}| + |\phi\text{min}|/T_o$$

Also, when the modulation rate of this transmission system is denoted by 1/T (baud) where $T \geqq T_o$, the following relationship is needed:

a maximum value of $\phi(\pi \geqq \phi\text{max} > 0)$ is denoted by $\phi$max, and a minimum value of $\phi(-\pi \leqq \phi\text{min} \leqq 0)$ by $\phi$min.

Now, the invention will be described in conjunction with the accompanying drawings, in which:

FIG. 1 is a block diagram showing a phase modulator used in the data signal transmission system of this invention;

FIGS. 2(*a*) through (*e*) are diagrams illustrating the operations of the phase modulator as in FIG. 1 in case of a binary phase modulation;

FIG. 3 is a circuit diagram showing an example of driving circuit as in FIG. 1;

FIGS. 4(*a*) and (*b*) are waveform diagrams showing the outputs of the driving circuits as in FIG. 3;

FIG. 5 is a circuit diagram showing an example of amplitude modulators as in FIG. 1;

FIGS. 6(*a*) through (*e*) are diagrams illustrating the operations of the amplitude modulator as in FIG. 5;

Figures 12, 13, 14:
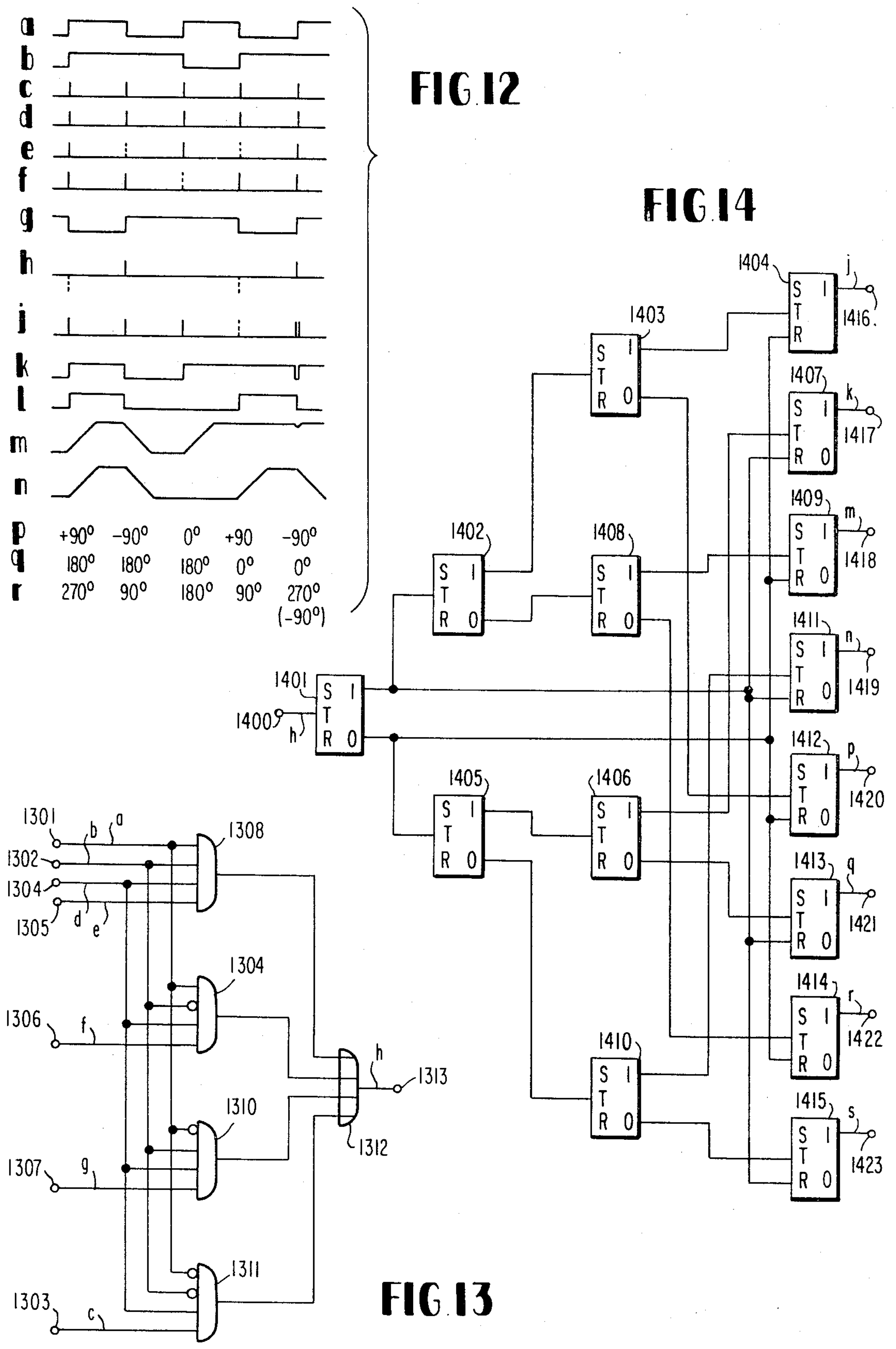
FIG. 12 is a waveform diagram showing the operations of the circuits as in FIGS. 10 and 11.
FIGS. 13 through 15 are circuit diagrams illustrating concrete examples of driving circuit shown in FIG. 1.
Figures 15, 16:
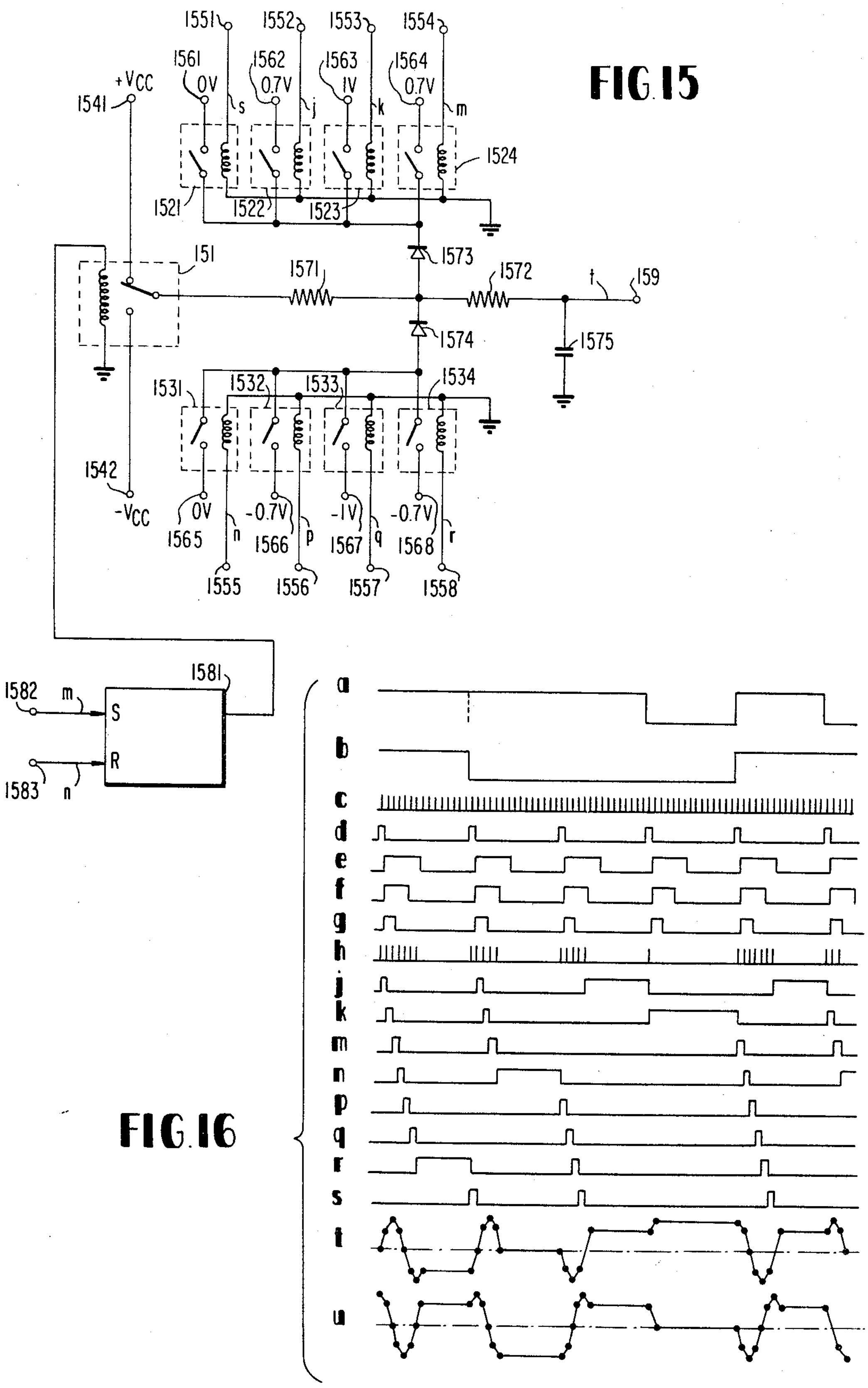
Figure 20:
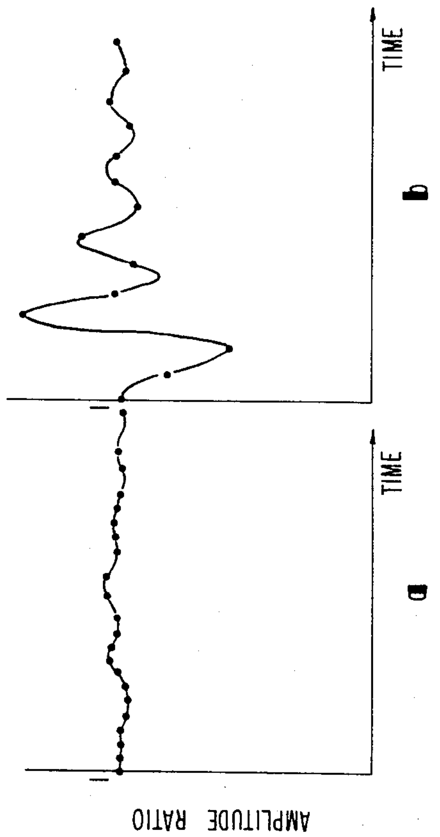
Figure 17:
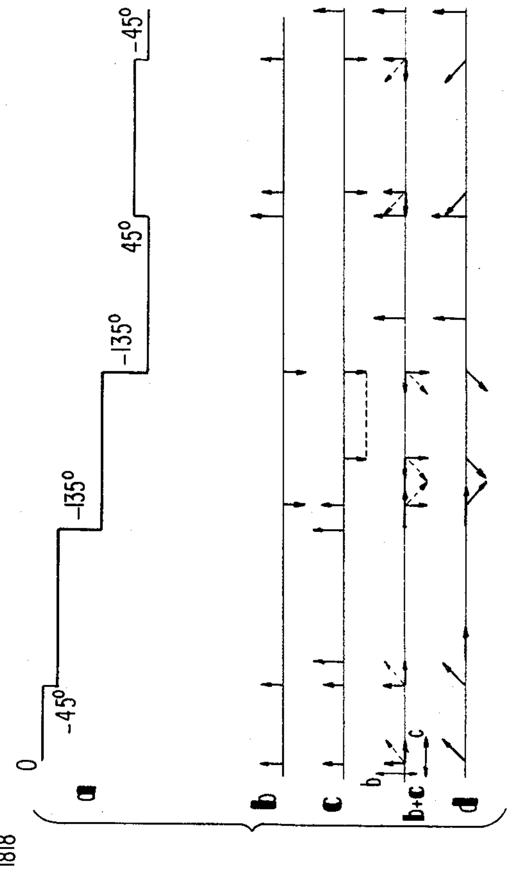
Figures 18, 19:
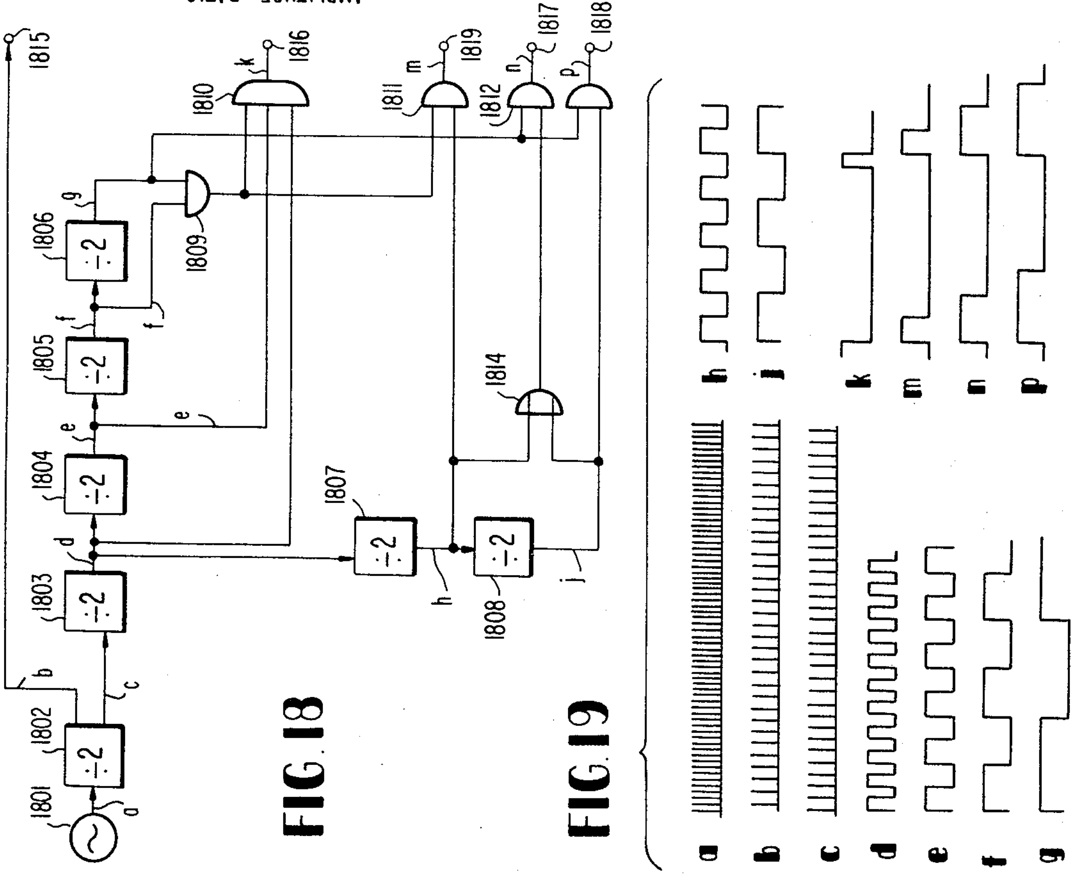

FIGS. 16($a$) througn ($u$) are waveform generated in the circuits as in FIGS. 13 through 15;

FIG. 17 is a waveform diagram illustrating the operation in the quaternary phase modulation;

FIG. 18 shows a timing circuit in connection with the operation as in FIG. 17;

FIGS. 19($a$) through ($p$) are waveforms generated in the circuit as in FIG. 18; and FIG. 20 shows in comparison waveforms generated in 135° phase shift operation.

Figure 1:
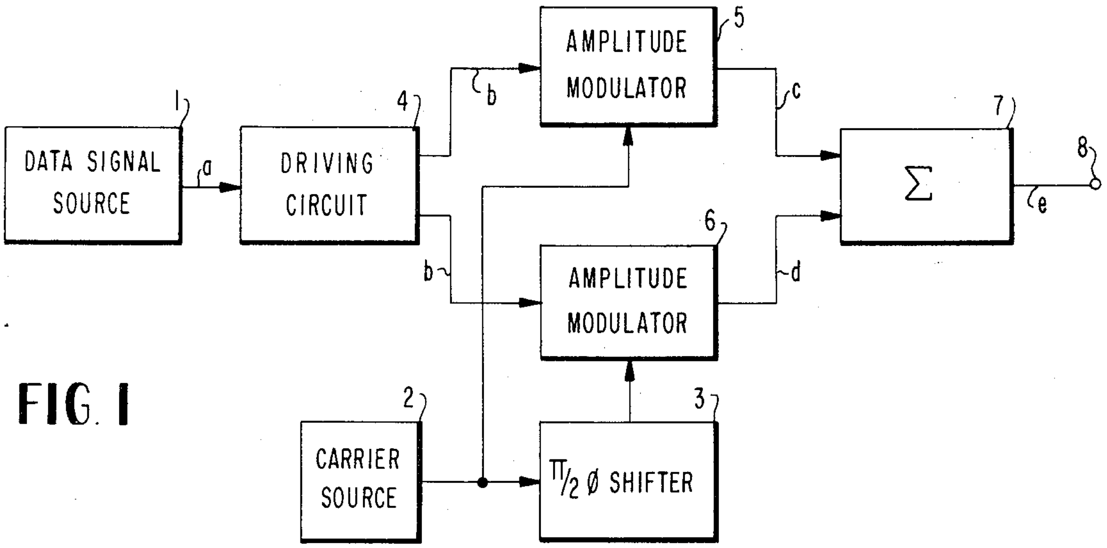
Figure 2:
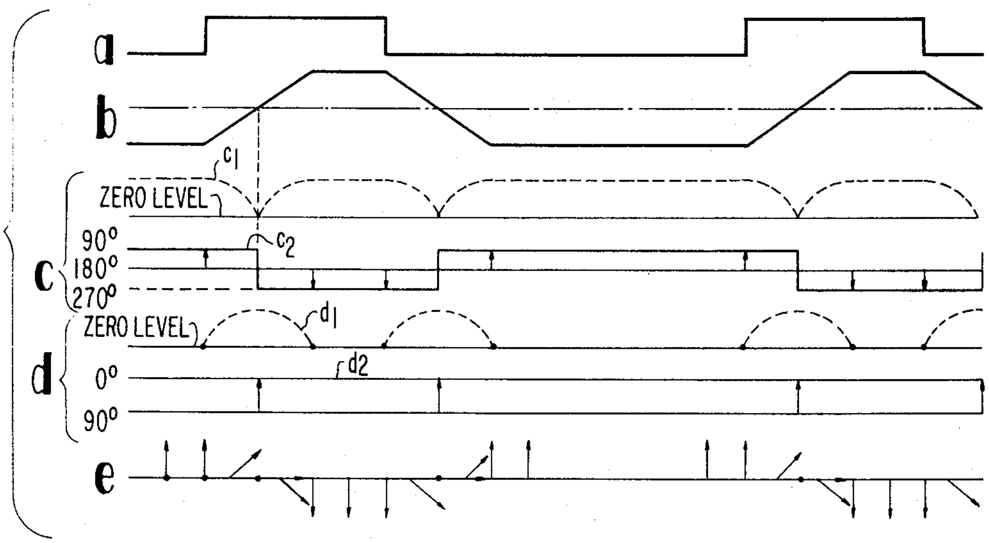

In FIG. 1, the reference 1 denotes a data signal source; 2 a carrier source; 3, a 90° phase shifter; 4, a driving circuit; 5 and 6, amplitude modulators; 7, a summing circuit; and 8, a phase-modulated signal output terminal. The data signal source 1 delivers a series of binary data signal as shown in FIG. 2$a$. This output signal is converted into a driving signal as shown in FIG. 2$b$ by the driving circuit 4. The converted driving signal drives the amplitude modulators 5 and 6 and shifts the amplitudes of two carriers sinusoidally to specific level respectively. The outputs of amplitude modulators 5 and 6 are as shown in FIGS. 2$c$ and 2$d$ respectively, wherein the phase ($c_2$ of FIG. 2$c$) of output of modulator 5 is changed by 180° (e.g. 90° to 270° ) every time the amplitude of the driving signal (FIG. 2$b$) crosses the zero level (center line). The phase ($d_2$ of FIG. 2$d$) of the output of modulator 6 is held constant and in quadrature relationship with the phase of the output of the modulator 5, and the envelopes of each of the outputs is varied as shown by the broken lines ($c_1$ of FIGS. 2$c$ and $d_1$ of FIG. 2$d$ ). These signals are summed together by the summing circuit 7 which may be a hybrid type transformer or the like whereby a phase-modulated signal with a constant amplitude, as shown in FIG. 2$e$ is provided at the output terminal 8. FIG. 2$e$ shows vector diagrams of the composite vector derived from the signal (FIG. 2$c$) and signal (FIG. 2$d$) plotted on the ordinate and abscissa, respectively. From those vector diagrams, it is apparent that the carrier phase is shifted by 180° at each shift of the data signal from one state to another.

The foregoing operation is an example using binary phase-modulated signal. Generally, the phase modulator based on multi-phase modulation is operated on the same principle as those on the binary phase modulation, excepting that the amount of phase shift is small in multi-phase modulation.

Figure 3:
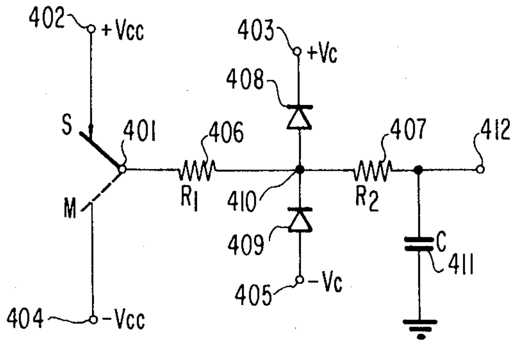
Figure 4:
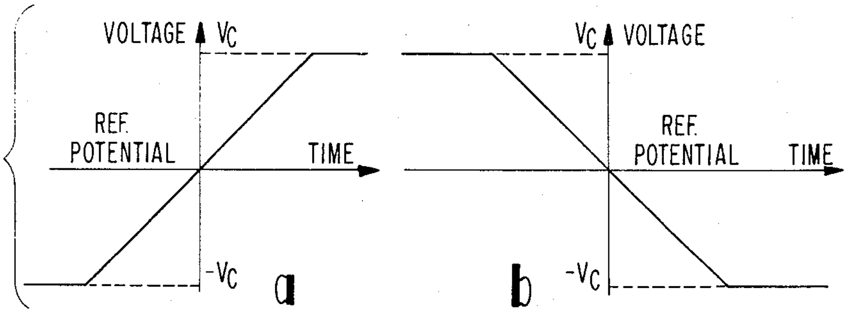

The circuits as in FIG. 1 will specifically be described below. FIG. 3 is a circuit diagram showing an example of driving circuit 4 shown in FIG. 1, and FIGS. 4($a$) and ($b$) show output waveforms thereof. In FIG. 3, the reference 401 denotes a switch; 402 and 403, positive potential DC sources ($Vcc$ and $Vc$ are absolute potential values thereof where $Vcc > Vc$); 404 and 405, negative potential DC sources ($-Vcc$ and $-Vc$ are potential values thereof); 406 and 407, resistors whose resistance values are $R_1$ and $R_2$, respectively; 408 and 409, diodes; 410, the connection point of these diodes; 411, a capacitor whose capacitance value is C; and 412, an output terminal. It is assumed that the switch 401 is placed to S (space) side as indicated by the full line when the series binary data signal is of space, and to M (mark) side as indicated by the broken line when it is of mark. When the forward resistances in the diodes 408 and 409 are negligible, the potential at the connection point 410 is clamped at $+Vc$ by the diode 408 or at $-Vc$ by the diode 409. Therefore, when the signal state is in the space, the potential at the terminal 412 is increased according to the time constant $(R_1+R_2)C$. When the potential at the connection point 410 reaches $+Vc$, this potential is clamped by the diode 408. After this moment, the potential at the terminal 412 is held at $+Vc$. When the mark state comes, the potential at the terminal 412 is reduced according to the time constant $(R_1+R_2)C$. Thus, when the potential at the connection point 410 reaches $-Vc$, this potential is clamped by the diode 409. After this moment, the potential at the terminal 412 is held at $-Vc$. As a result, a waveform as in FIG. 4 is delivered from the output terminal 412. FIG. 4($a$) shows the output waveform from space to mark, and FIG. 4($b$) the output waveform from mark to space.

Figures 5, 7:
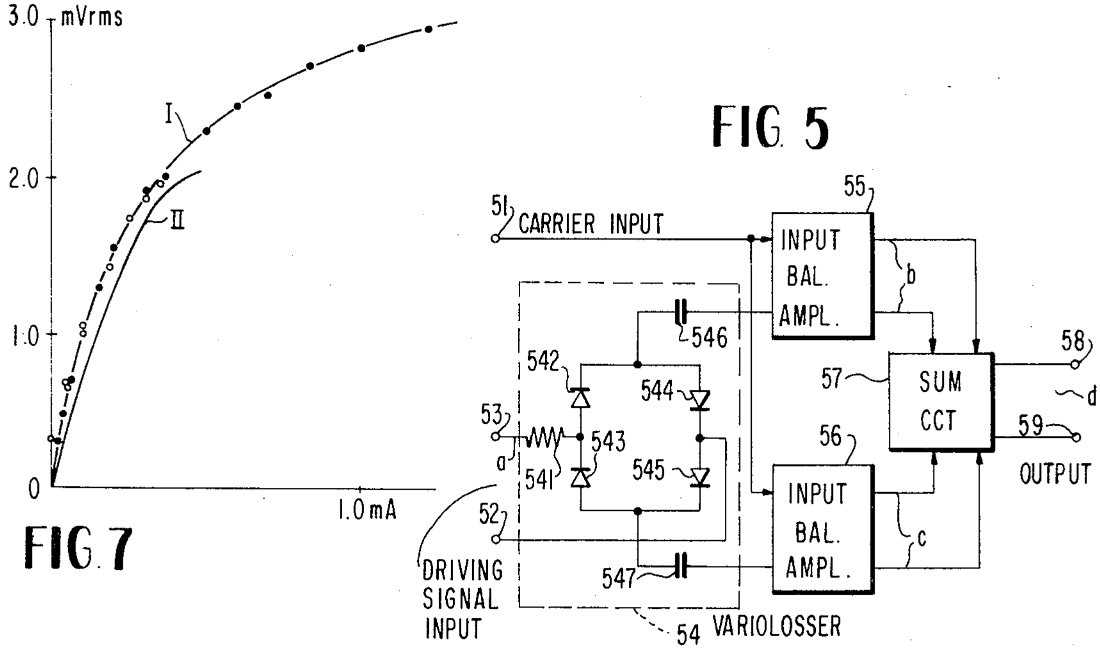
FIG. 7 is a diagram showing the characteristic of a variolosser circuit used in the amplitude modulator as in FIG. 5.
Figure 6:
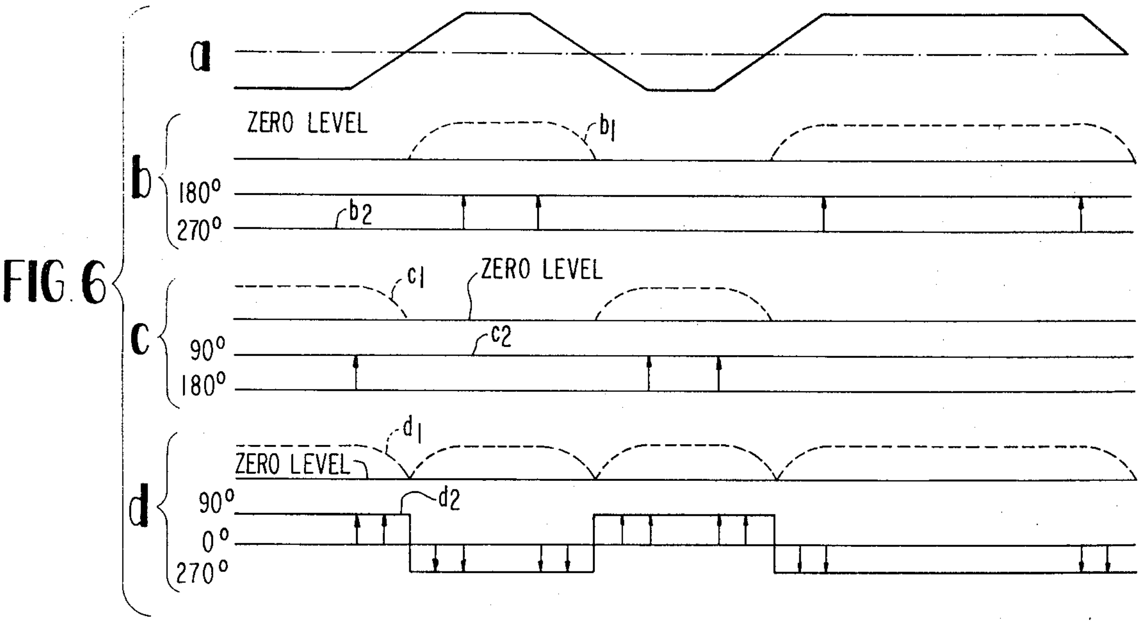

Referring to FIG. 5, there is shown an example of amplitude modulator as in FIG. 1. There are several methods for the amplitude modulation, such as changing gain of an amplifier, changing the input or output impedance, and so on. In this example of FIG. 5, the amplitude modulation is carried out by changing the amplifier input impedance by using a variolosser. In FIG. 5, the terminals 51 and 52 constitute a carrier input terminal pair, terminals 53 and 52 constitute a driving signal input terminal pair, 54 denotes a variolosser, 55 and 56, input balancing amplifiers, 57, a summing circuit, and 58 and 59, an output terminal pair. FIG. 6($a$) through ($d$) are waveform diagrams of individual circuits of the amplitude modulator as in FIG. 5. A carrier wave is applied to the terminal pair 51 and 52, and driving signal as shown in FIG. 6$a$ is applied to the terminal pair 53 and 52. This modulator drive signal comprises positive and negative DC components to drive the variolosser 54 (the one-dot chain line in FIG. 6($a$) indicates the zero potential). The amplifiers 55 and 56 are arranged so that the phases of their outputs differ by 180° from each other (to do this, for example, transformer input type amplifiers are used, and the windings of the transformers are mutually reversely connected). Then, the variolosser is connected to the input side of the amplifiers via capacitors 546 and 547 for the purpose of DC cut, whereby the driving signal acts only to shift the impedance of the variolosser and not to affect the carrier input circuit. Two pairs of diodes 542, 543 and 544, 545 in the variolosser 54 are connected to each other so as to prevent simultaneous change of both impedances of the amplifier 55 and 56. When the terminal 53 stands at a positive potential with respect to the terminal 52 (which is assumed to stand at zero potential), the diodes 542 and 544 become conductive and the impedances of these diodes vary according to the potential at the terminal 53. (Note: This impedance varying characteristic is not always proportional but depends upon the characteristics of the diodes.) Accordingly, the impedance of the diode 544 serves to change only the input impedance of the amplifier 55. Similarly, when the potential at the terminal 53 is negative, the diode 545 changes only the input impedance of the amplifier 56. (Note: the impedance of the diode in the off state is several megohms.) The input impedances of the amplifiers 55 and 56 are controlled by the driving signal as in FIG. 6$a$, and the amplitude-modulated carrier outputs is obtained at the output terminal of the amplifiers 55 and 56 according to the characteristic of the variolosser. The variolosser 54 may be formed of FET (Field Effect Transistor) or other suitable elements.

An example of the characteristic of the variolosser 54 is shown by the curve I in FIG. 7. The ideal sinusoidal characteristic is indicated by the curve II. It is apparent from FIG. 7 that the curve I is a good approximation of the curve II. The output signals of the amplifiers 55 and 56 are shown in FIGS. 6b and 6c respectively, wherein $b_1$ and $b_2$ denote the envelope and phase of the output of the amplifier 55 respectively, and $c_1$ and $c_2$ denote the envelope and phase of the output of the amplifier 56 respectively. These output signals are summed by the summing circuit 57 and then delivered as an output signal as in FIG. 6d (namely, the signal as in FIG. 2c) to the terminals 58 and 59. In FIG. 6d, $d_1$ and $d_2$ denote the envelope and the phase of the output signal of summing circuit 57.

Figures 8, 9, 10:
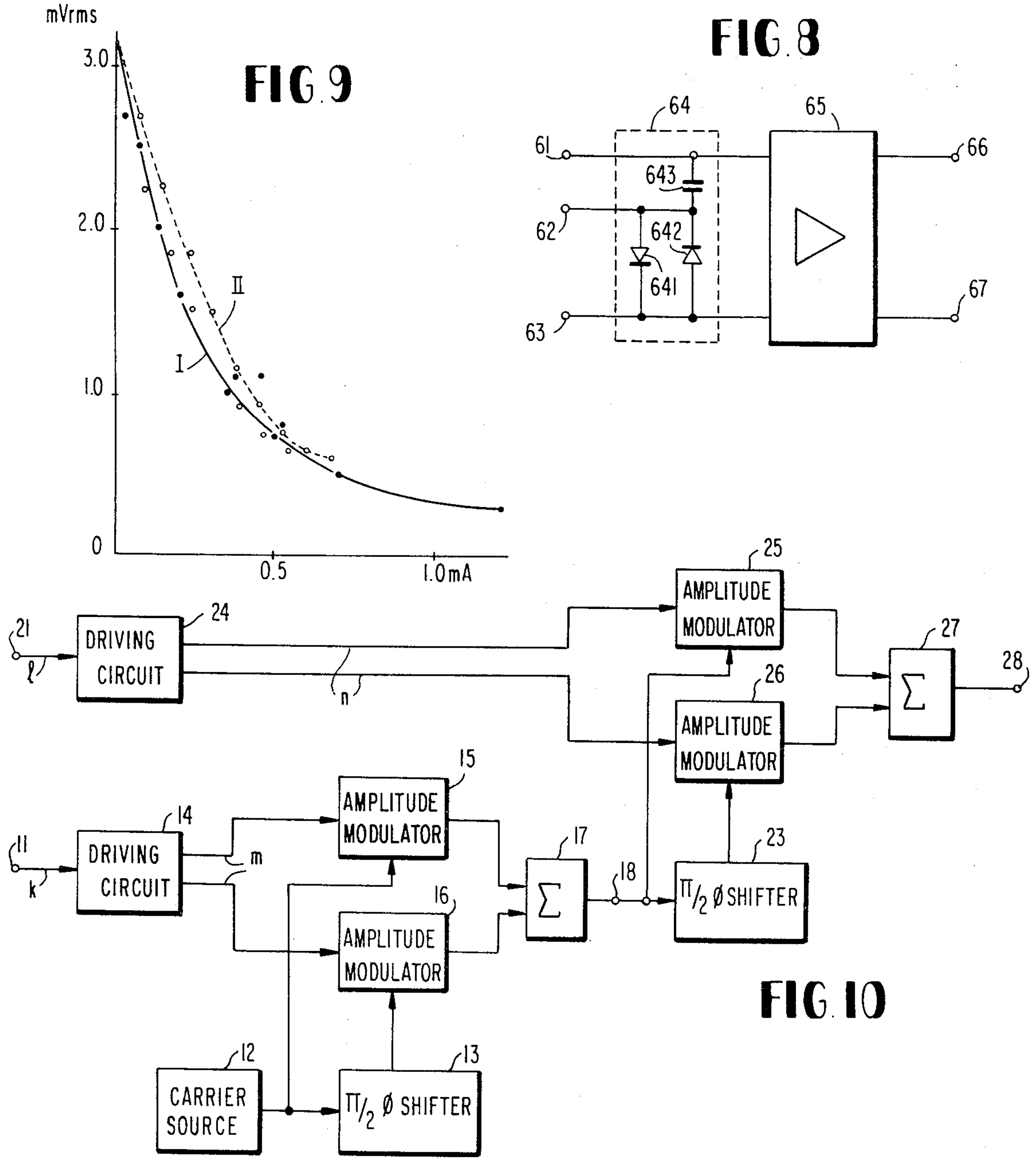
FIG. 8 is a circuit diagram showing another example of the amplitude modulators as in FIG. 1.
FIG. 9 is a diagram showing the characteristic of a variolosser circuit used in the amplitude modulator as in FIG. 8.
FIG. 10 is a circuit diagram showing an example of multi-phase modulators embodying this invention.

FIG. 8 shows an example of another amplitude modulator 6 shown in FIG. 1. In FIG. 8, the references 61 and 63 represent carrier input terminal pair; 62 and 63, driving signal input terminal pair; 64, a variolosser; 65, an amplifier; 66 and 67, output terminal pair, and 643, a capacitor for DC cut. A driving signal (FIG. 2b) for the amplitude modulator is applied to the terminal pair 62 and 63, and the potential at the terminal 62 is changed to positive and negative with respect to the reference potential (zero potential) at the terminal 63, whereby the amplitude-modulated output signal is obtained at the output terminal pair 66 and 67, according to the characteristics of the variolosser diodes 641 and 642. The characteristic of the variolosser 64 is shown by the curve I in FIG. 9 and an ideal sinusoidal characteristic by the curve II thereof.

While the foregoing description is given relating to binary phase modulator, phase modulation of n-phase (n: a positive integer) can be done by serially connecting phase modulators as shown in FIG. 10. In FIG. 10, the references 11 and 21 denote input terminals; 12, a carrier source; 13 and 23, 90° phase shifters; 14 and 24, driving circuits; 15, 16, 25 and 26, amplitude modulators; 17 and 27, summing circuits; and 18 and 28, output terminals.

Assume that this phase modulator is a quaternary phase modulator, making phase shift available at any angle 0°, 90°, 180° or 270°. Then the modulators located between the terminals 11 and 18 are operated so as to shift the carrier phase in 180° step at each conversion point of the input signal at the terminal 11. While, the modulators between the terminals 21 and 28 are operated so as to shift the carrier phase by +90° and −90° alternately at each conversion point of the input signal at the terminal 21. The combined phase angle of the combined output of the two modulators should correspond to the combined value of the two input data signals. To this end, it is necessary to make some arrangement for the binary signal given to the terminals 11 and 21.

Figure 11:
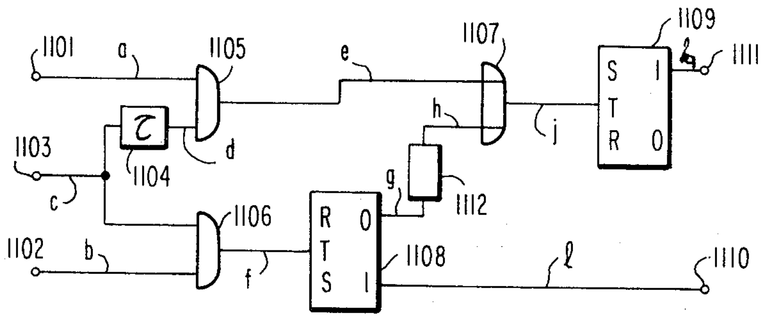
FIG. 11 is a block diagram showing an auxiliary circuit for the driving circuit as in FIG. 10.

FIG. 11 shows a circuit for providing binary signals to be supplied to the terminals 11 and 21 shown in FIG. 10. FIGS. 12a through 12r (hereinafter briefly 12-a through 12-r) illustrate the operations of the circuits as in FIGS. 10 and 11.

Two data input signals (12-a and 12-b) which are bit-synchronized with each other are applied respectively to input terminals 1,101 and 1,102 in FIG. 11. A timing signal (12-c) is applied to an input terminal 1103. This signal is generated slightly behind the conversion time point of the two input signals. The timing signal (12-c) is further delayed slightly (12-d) by a delay element 1104 and then is AND-gated by the data input signal (12-a) in an AND gate 1105. The resultant output is applied to T-terminal of a JK-type flip-flop 1109 through an OR gate 1107 (12-j). The timing signal (12-c) and another data input signal (12-b) are gated by an AND gate 1106, and the resultant signal (12-f) is applied to T-terminal of a JK-type flip-flop 1108. The "O" (complementary side output (12-g) of the flip-flop 1108 is differentiated by a differential circuit 1112, whose output signal (12-h) is applied together with the output signal (12-e) of the gate 1105, to T-terminal of flip-flop 1109 via OR gate 1107 (12-j). Thus, an output signal (12-k) is delivered on the "l" (true value) side of flip-flop 1109, and another output signal (12-l) is given on the "l" (true value) side of the flip-flop 1108. These two signals (12-k and 12-l) are applied to the terminals 21 and 11 in FIG. 10.

The driving circuits 14 and 24 in FIG. 10 receive the signals (12-k and 12-l) respectively, and generate driving signals (12-m and 12-n). Thus, on the foregoing principle, a carrier subjected to phase shift as (12-q) is delivered to the terminal 18, and the resultant carrier wave is further subjected to phase shift (12-p), namely the carrier subjected to the combined phase shift (12-r) makes one-to-one correspondence to the combination of the input data signals (12-a and 12-b).

Also, another type of phase modulator of n-phase may be formed by connecting in parallel the same modulators as shown in FIG. 5. Namely, both the amplitude modulators 5 and 6 in FIG. 1 can be used with the same modulators as shown in FIG. 5.

In this case, two driving signals applied to the amplitude modulators 5 and 6 of FIG. 1 should not be the same; different driving signals must be used, assuming that two data inputs are supplied to the mentioned another type of phase modulator in the same manner as in FIG. 10.

FIGS. 13 through 15 are circuit diagrams showing concrete examples of driving circuit 4 shown in FIG. 1 for supplying said different driving signals, and FIG. 16 shows waveforms (a) through (u) (hereinafter briefly 16-a through 16-u) illustrating the operations of the driving circuits as in FIGS. 13 through 15.

In FIG. 13, two data input signals (16-a and 16-b) are supplied to the terminals 1301 and 1302, and timing signals (16-c through 16-g) to the terminals 1303 through 1307, respectively (how to form these timing signals will be described later). The input signals and timing signals are subjected to logical operations by a logical circuit comprising AND gates 1308 through 1311 and an OR gate 1312. By this, a pulse output (16-h) is delivered to a terminal 1313. The number of pulses (16-h) concentrated at each bit corresponds to the number of successive conversions each done on the signals in one direction by a unit phase shifting angle. Needless to say, this number of conversions corresponds to the combination of the two input data signals.

Referring to FIG. 14, the pulse (16-h) is applied to a terminal 1400, and pulses (16-j through 16-s) are obtained output terminals 1416 through 1423 from the "l" (true value) side of a JK-type flip-flops 1404 through 1415 constituting a logical circuit together with JK-type flip-flops 1401 through 1415.

The circuit shown in FIG. 15 is controlled by the above-mentioned pulses (16-j through 16-s), thus driving the amplitude modulators 5 and 6 (FIG. 1). As shown therein, the pulses (16-j through 16-s) are applied to the terminals 1551 through 1558, to operate the relays 1521 through 1524 and relays 1531 through 1534 only for the period these pulses are present. Several DC voltages as illustrated in FIG. 15 are applied to the individual contacts of said relays 1521 through 1524 and 1531 through 1534 by way of the terminals 1561 through 1568. Pulses (16-*m* and 16-*n* ) are also applied to the set input and reset input of a flip-flop 1581 via terminals 1582 and 1583. The terminals 1541 and 1542, resistors 1571 and 1572, diodes 1573 and 1574 and capacitor 1575 shown therein are the same as those shown in FIG. 3. In this circuit, it is assumed that $Vcc$ is greater than 1 volt. In the above arrangement, it is apparent that an output signal of waveform (16-*t*) can be obtained at an output terminal 159. It is also apparent that a waveform (16-*u*) can be obtained from another driving circuit similar to the driving circuit as shown in FIGS. 13 through 15. More particularly, this driving circuit can be realized by changing in the circuit of FIG. 15 the input DC voltage applied to the terminal 1561 through 1568. Needless to say, the wave form (16-*u*) must satisfy the mentioned equation (2) (the constant amplitude condition).

FIGS. 17(*a*) through (*d*) show waveforms provided through quarternary phase modulation in the system constituted as above. FIG. 17(*a*) shows a signal phase-shift for phase modulation, and FIGS. 17(*b*) and (*c*) are outputs of two modulators, whose amplitudes are shifted to zero, $\pm 1$ and $\pm 1/\sqrt{2}$ according to Equation (2).

FIG. 17(*d*) shows the combined waveform of FIGS. (*b* ) and (*c*) and is delivered as an output to the terminal 8 of FIG. 1.

FIG. 18 is a timing circuit for generating the above-mentioned waveforms (16-*c* through 16-*g*), and FIGS. 19(*a*) through (*p*) show waveforms thereof. In FIG. 18, the reference 1801 denotes an oscillator for oscillating at a frequency twice as high as 16-*c*, 1802 through 1808 frequency divider circuits, 1809 through 1813 AND gates, 1814 an OR gates, and 1815 through 1819 timing signal output terminals. The reference (*a*) through (*p*) of FIG. 19 are used for indicating the corresponding waveforms in the circuit of FIG. 18. The waveforms (16-*c* through 16-*g*) correspond to FIG. 19(*b*), (*k*), (*m*), (*n*) and (*p*) respectively.

FIGS. 20(*a*) and (*b*) show waveforms of the envelopes of the outputs carrier phase-modulated according to the invention and the conventional instaneous phase-shifting method respectively, seen through a band pass filter with $0.3 \approx 3.4$ kHz band-width, when the amount of phase-shifting is 135° in the both cases. Each the ordinates of these drawings represent the ratio the amplitude of the phase-shifted carrier to that of non-phase-shifted carrier, and the abscissa the time. It is apparent from this graph that the system of this invention produces little intersymbol interference and waveform distortion.

Although the most advantageous amplitude modulation in this system is of sinusoidal deviation type, other modulators such as linear or exponential deviation type modulator may be employed for simplified amplitude modulation.

What is claimed is:

1. A data signal transmission system employing phase modulation wherein a carrier wave is phase-shifted once at every conversion point of at least one signal, comprising:

means for receiving a data signal exhibiting two states representing first and second information states, driver means for generating at least one driving signal corresponding to said received data signal, said driving signal including at least two predetermined levels distributed symmetrically with respect to a predetermined reference level and transitions corresponding to the conversion points from one level to another in said data signal, said transitions occuring over a predetermined time interval equal to or greater than a time defined as $|\phi max| + |\phi min| /W$, but less than the period of the input data signal, $\phi max$ $\phi min$, representing the maximum and minimum values of the phase shift angles of said carrier wave and W an angular frequency bandwidth, means for generating first and second carrier waves, one fixedly phase shifted substantially 90° with respect to the other, first and second modulating means receiving said driving signal and said first and second carrier waves for generating a first and second modulated signals each of whose amplitudes is changed transitionally from one stable amplitude to another in response to said transitions and whose phase driving signal crosses said reference level, said stable amplitudes corresponding to said predetermined levels, and means for combining the modulated outputs from said first and second modulating means, thereby to provide said carrier phase shifted in response to the transistion of the data signals at each conversion point over said predetermined time interval, wherein amplitudes of said first and second modulated signals are changed so as to make the amplitude of the output of said combining means substantially constant, wherein a couple of said data signals are quaternary phase modulated, further comprising:

a second driver means for generating second driving signals having at least two predetermined levels distributed symmetrically with respect to a second predetermined reference level and transition periods equal to said predetermined time interval, phase shifter means coupled to said combining means for fixedly shifting the output of said combining means by substantially 90°, third and fourth modulating means responsive to said second driving signals, and the output of said combining means and said phase shifter means for generating a third and fourth modulated signals each of whose amplitudes is changed transitionally from one further stable amplitude to another in response to said transitions and whose phase alternates by 180° when said second driving signals crosses said second reference level, said further stable amplitudes corresponding to said second predetermined levels, and second combining means for combining the modulated outputs from said third and fourth modulating means to deliver the quaternary phase modulated output signal in response to said data output signal.

2. The data signal transmission system of claim 1, wherein one of said data signals is binary phase modulated, and said driver means includes:

first, second, third and fourth reference direct-current voltage sources whose voltages are $+Vcc$, −Vcc, +Vc, and −Vc respectively where Vcc and Vc are absolute values of said voltage sources and Vcc is greater than Vc, switching means for selectively connecting a center tap thereof to one of said first and second voltage sources in response to said first and second information states, a series circuit of two resistive elements, one end of said series circuit being connected to said center tap, a first diode element connected between said third voltage source and the intermediate junction of said series circuit, a second diode element connected between said fourth voltage source and said intermediate junction, a capacitor connected between another end of said series circuit and zero potential, and an output terminal connected to said another end for delivering said driving signal.

3. The data signal transmission system of claim 2, wherein said first modulating means includes;

first and second amplifiers of input-balancing type, a variable impedance circuit coupled to the inputs of said first and second amplifiers for varying the input impedances to said first and second amplifiers in response to said data signal, and a summing circuit for summing the outputs of said amplifiers to deliver said first modulated signal.

4. The data signal transmission system of claim 3, wherein said second modulating means includes;

a third amplifier, a variable impedance circuit coupled to the input of said third amplifier for varying the input impedance of said third amplifier in response to said data signal, and an output terminal pair coupled to said third amplifier for delivering said second modulated signal.

5. The data signal transmission system of claim 1, wherein said data signals are quaternary phase modulated, each of said first and second modulating means includes:

first and second amplifiers of input-balancing type, a variable impedance circuit coupled to the inputs of said first and second amplifiers for varying the input impedances to said first and second amplifiers in response to said data signal, and a summing circuit for summing the outputs of said amplifiers to deliver each of said first and second modulated signals;

and said driving circuit includes:

a timing circuit for generating a clock pulse train and gating pulse trains whose pulse width corresponds to predetermined number of the clock pulses of said clock pulse train, a first logic circuit responsive to said data signals, said clock pulse train and said gating pulse trains for generating a burst clock pulse train with concentrated clock pulses in each period of said data signals, number of said concentrated clock pulses corresponding to the combination of levels of said data signals in each the period thereof, a second logic circuit responsive to said burst clock pulse train for generating first driving pulses, the leading and trailing edges of each of said first driving pulses corresponding to each successive couple of pulses among said concentrated clock pulses and being successively delayed by the clock period of said clock pulse train and for generating second driving pulses with leading and trailing edges corresponding to the last clock pulse in the preceding concentrated clock pulses and the first clock pulse in the succeeding concentrated clock pulses, wave form shaping circuits each having a couple of first reference voltage sources whose voltages are equal in absolute value to each other and greater than the maximum voltage among the voltages of said first reference direct current reference sources and opposite in polarity to each other, a plurality of second reference direct current voltage sources whose voltage correspond to upper-half of predetermined levels of said driving with respect to said predetermined reference level, a plurality of third reference direct current voltage sources whose voltages correspond to nether-half of said predetermined level, first switching means for selectively connecting a center tap thereof to one of said first voltage sources in response to a control signal, a series circuit of at least two diode elements connected unidirectionally, a second switching means for selectively connecting one end of said series circuit of diodes to one of said second reference voltage sources, a third switching means for selectively connecting another end of said series circuit of diodes to one of said third reference voltage sources, a control circuit receiving two driving signals each being selected from each of said first and second driving pulses for delivering said control signal to control said first switching means in response to which of said second or third reference voltage sources should be applied to said series circuit of diodes, a first resistor element connected between the center tap of said first switching means and the intermediate connecting point of said series circuit of diodes, a second resistor element whose one end is connected to said intermediate junction, a capacitor element connected between another end of said second resistor element and a substantial ground, and an output terminal connected to another end of said resistor element to deliver said driving signal.

* * * * *

UNITED STATES PATENT OFFICE
CERTIFICATE OF CORRECTION

Patent No. 3,755,739 Dated August 28, 1973

Inventor(s) Yoshimitsu OKANO

It is certified that error appears in the above-identified patent and that said Letters Patent are hereby corrected as shown below:

Column 1, line 10 - Delete comma after "which"

line 28 - After "1958)" insert -- . --

Column 5, line 64 - Delete "1,101 and 1,102" and substitute -- 1101 and 1102 --

Column 6, line 8 - Delete "O" and substitute -- 0 -- line 8 - After "(complementary" insert -- ) --

Signed and sealed this 9th day of April 1974.

(SEAL)
Attest:

EDWARD M.FLETCHER,JR.
Attesting Officer

C. MARSHALL DANN
Commissioner of Patents

USCOMM-DC 60376-P69
★ U.S. GOVERNMENT PRINTING OFFICE : 1969 O—366-334.